INVENTOR.
Arnold Lesti

April 12, 1955 A. LESTI 2,706,216

COLOR TELEVISION RECEIVER WITH REGISTRATION CONTROL

Filed June 22, 1951 4 Sheets-Sheet 2

INVENTOR.
Arnold Lesti

INVENTOR.
Arnold Lesti

April 12, 1955 A. LESTI 2,706,216
COLOR TELEVISION RECEIVER WITH REGISTRATION CONTROL
Filed June 22, 1951 4 Sheets-Sheet 4
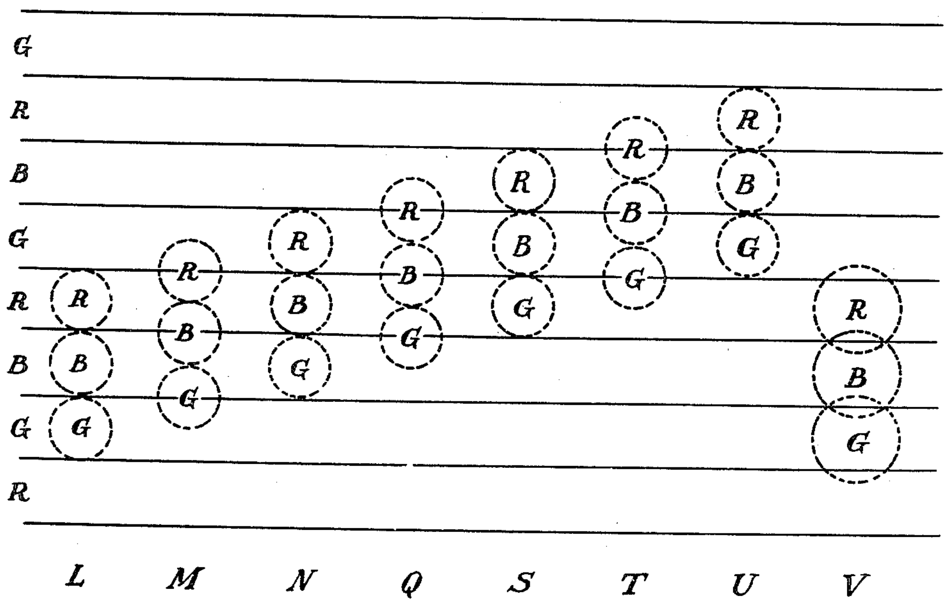
FIG. 5A.
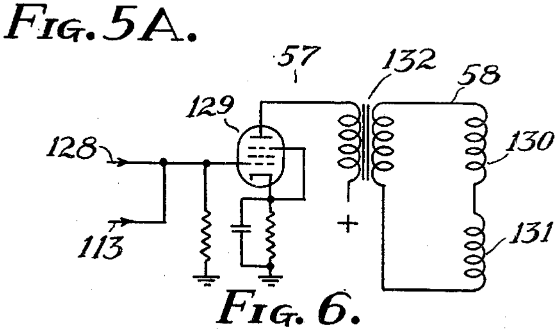
FIG. 6.
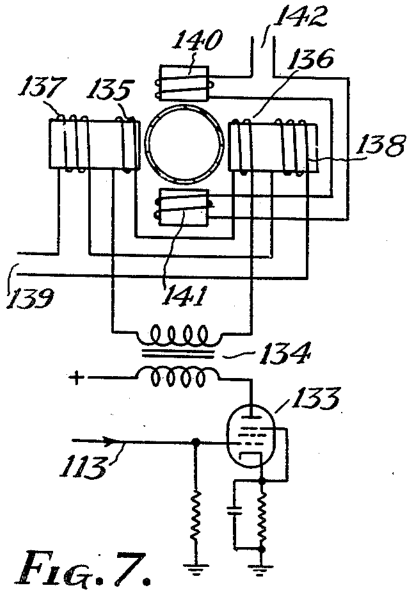
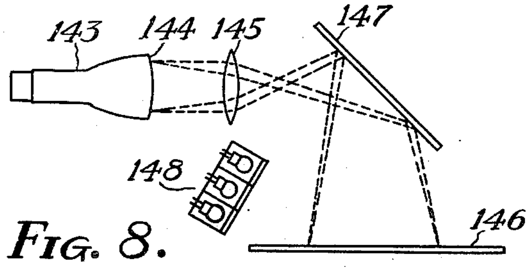
INVENTOR.
Arnold Lesti

United States Patent Office 2,706,216

Patented Apr. 12, 1955

2,706,216

COLOR TELEVISION RECEIVER WITH REGISTRATION CONTROL

Arnold Lesti, Nutley, N. J.

Application June 22, 1951, Serial No. 233,066

9 Claims. (Cl. 178—5.4)

This invention is in a method and system for obtaining color pictures in television receivers of the type which are adapted to receive signals from color television transmitting stations which transmit separate picture information simultaneously for each of the primary colors of the color system. This form of color television transmission is well known to the art and an object of this invention is to provide improved color television receivers to operate on signals from such stations.

An object of the present invention is to provide a simple improved stable fully electronic color television receiver which does not require any continuously moving mechanical component, which will give excellent color registration, which will provide brightly colored pictures, and which does not require critically aligned components.

Another object of this invention is to provide an improved color television receiver which can receive black-and-white television signals from stations transmitting such signals without any changes, additions or alterations required in the color television receiver. In this connection a further object is to provide an improved color television receiver which is adapted to receive signals from color transmitting stations which may be received as black-and-white pictures by standard black-and-white television receivers.

An important object of this invention is to produce a brightly colored television picture by allowing the electron beam of the cathode ray picture tube to remain on the screen for the maximum possible time. Aperture masks to block and restrict the electron beam before it reaches the screen are unnecessary and avoided. The screen area is fully utilized. Full light intensity is produced at the phosphor source without filtering.

In accordance with certain features of this invention there is utilized a cathode ray television receiving picture tube in which there are three types of phosphors deposited on the screen in separate spatial relation to each other but contiguous. There is a phosphor for each of the primary colors. One of the phosphors has the luminescent property of emitting red light, another blue light, and the third green light when bombarded by the electron beam. The entire screen is filled with phosphors without any gaps.

An important object of this invention is to provide an electron beam of the cathode ray picture tube which comprises separate beam portions for each of the primary colors. One portion of the electron beam is modulated by red light signals, a second portion by blue light signals, and the third portion by green light picture signals. The three portions of the electron beam are contiguous and are deflected together for picture scanning as if the three portions comprised one beam.

An important object of this invention is to cause the electron beam with the three independently modulated portions, hereinbelow referred to as the triple beam, to move towards areas of the screen in which the red light modulated portion of the triple beam falls on the red light emitting phosphor areas of the screen, the blue light modulated portion of the triple beam falls on the blue light emitting phosphor areas of the screen, and the green light modulated portion of the triple beam falls on the green light emitting areas of the screen. In this manner the red, blue, and green light is generated simultaneously in accordance with the respective degree of modulation, thereby producing the correct color saturation simultaneously. The separation between the contiguous color producing areas of the screen equals that of the corresponding portions of the triple beam when it strikes the screen. The manner of controlling the triple beam of electrons is by a feedback path which includes the light emitted when the triple beam strikes the screen. Light sensitive devices are provided one for each of the primary colors, which are responsive to light of the corresponding color to test the light actually emitted by the screen, and if the electron beam tends to move off of the proper color producing areas, the feedback path involving the light sensitive devices will correct the electron beam and direct it towards the desired color producing areas of the screen.

In this connection a further feature of this invention is to provide three light sensitive elements taking the form of photoelectric tubes with associated color filters with each tube responsive only to the primary color to which it corresponds, and to include these elements in a feedback path having three branches one for each of the three light sensitive elements. Each of the three branches of the feedback path has a gain which can be controlled by the color video signals which are also applied to control the modulation of the triple beam. The connections are such that the triple beam will move to the correct color producing areas of the screen. An important object of this invention is to provide the method and circuitry to cause the triple beam to move in such a manner so that the red modulated portion of the beam falls on the red emitting areas, the blue modulated portion of the beam falls on the blue emitting areas, and the green modulated portion falls on the green emitting areas. The reasons for the proper movements of the triple beam involving the interaction of all colors actually emitted from the screen and the video color signal modulation can be understood by a mathematical analysis which is given hereinbelow.

An important feature of this invention is to cause the triple beam to be shifted slightly in the vertical direction to the correct color producing areas of the screen which take the form of primary color producing substantially horizontal parallel areas. Such deflection is accomplished by auxiliary electrostatic deflection plates in one adaptation, by separate deflection coils in another, and by superimposing color control deflection voltages on the regular picture scanning deflection system in still another adaptation of this invention. Since the color producing areas are laid out horizontally with adjacent areas giving different colors, the triple electron beam requires little correction to keep it on the correct color producing areas as it sweeps horizontally. High brilliance and full detail is insured by allowing the beam to remain on the screen for the full time of the horizontal movement. The number of contiguous color producing horizontal areas is greater than three times the number of horizontal scanning lines required to produce one complete picture. The color areas are close enough together so that the light emitted by three adjacent areas when struck by the triple beam will not be distinguished as coming from separate areas, but will appear to come from one region whose color is the result of the combination or composite of the three separate colors blending into one.

In accordance with certain features of this invention the light sensitive elements take the form of photoelectric tubes with color filters placed back of the cathode ray picture tube in such a position so as to receive part of the light emitted in the back of the phosphor screen and thereby test the actual light emitted. Transparent portions in the walls of the picture tube are provided to allow the light to reach the photoelectric tubes. In another version of this invention the photoelectric tubes are placed inside of the cathode ray tube itself, and in a further version the photoelectric tubes are placed in front of the picture tube but out of the way of the viewer.

A further object of this invention to provide a cathode ray picture tube adapted to produce a triple beam which is capable of being adjusted initially for stable operation. The initial adjustment takes the form of slight fixed deflection settings on each of the three portions of the triple beam so that these portions fall one immediately above the other when the beam strikes the screen, with a separation equal to that of the contiguous color emitting areas of the screen. Deflection of the triple beam for picture scanning will not disturb the initial separation for any position to which the beam is deflected as a whole.

Another object of this invention is to obtain color television pictures from cathode picture tubes with a triple beam and without color phosphor screens, but with a standard white light emitting screen. Such tubes are used in conjunction with a translucent or transparent screen having the primary colors in the transparency or translucent material laid out in a manner similar to the color phosphor strips described hereinabove. The white picture of the picture tube with triple beam is projected on the said screen by standard optical means and photoelectric tubes with light filters receive the light from the picture tube after having impinged upon the screen. The operation is otherwise similar to that given for the phosphor color screen in the cathode ray picture tube. Of course, the latter may be used in an optical projection screen with a regular white screen.

Another object of this invention is to permit the use of a black-and-white component when desired in the system in addition to the components represented by the primary colors. The black-and-white component is to be applied as simultaneous modulation on each portion of the triple beam.

The above mentioned and other features and objects of this invention and the manner of attaining them will become more apparent and the invention itself will be best understood by reference to the following description of an embodiment of the invention taken in conjunction with the accompanying drawings in which:

Fig. 5A is a diagram of various positions of the triple beam on the screen. This diagram is used in connection with the mathematical analysis given hereinbelow.

Fig. 6 is a circuit diagram of standard vertical deflection coils showing the method of connecting the color controlling circuits thereto.

Fig. 7 is a circuit diagram of the deflection yoke showing auxiliary vertical deflection coils for color control.

Fig. 8 is a skeletonized view of a projection television system showing the path of the light rays and photoelectric tubes for color control.

Figures 1, 1B:
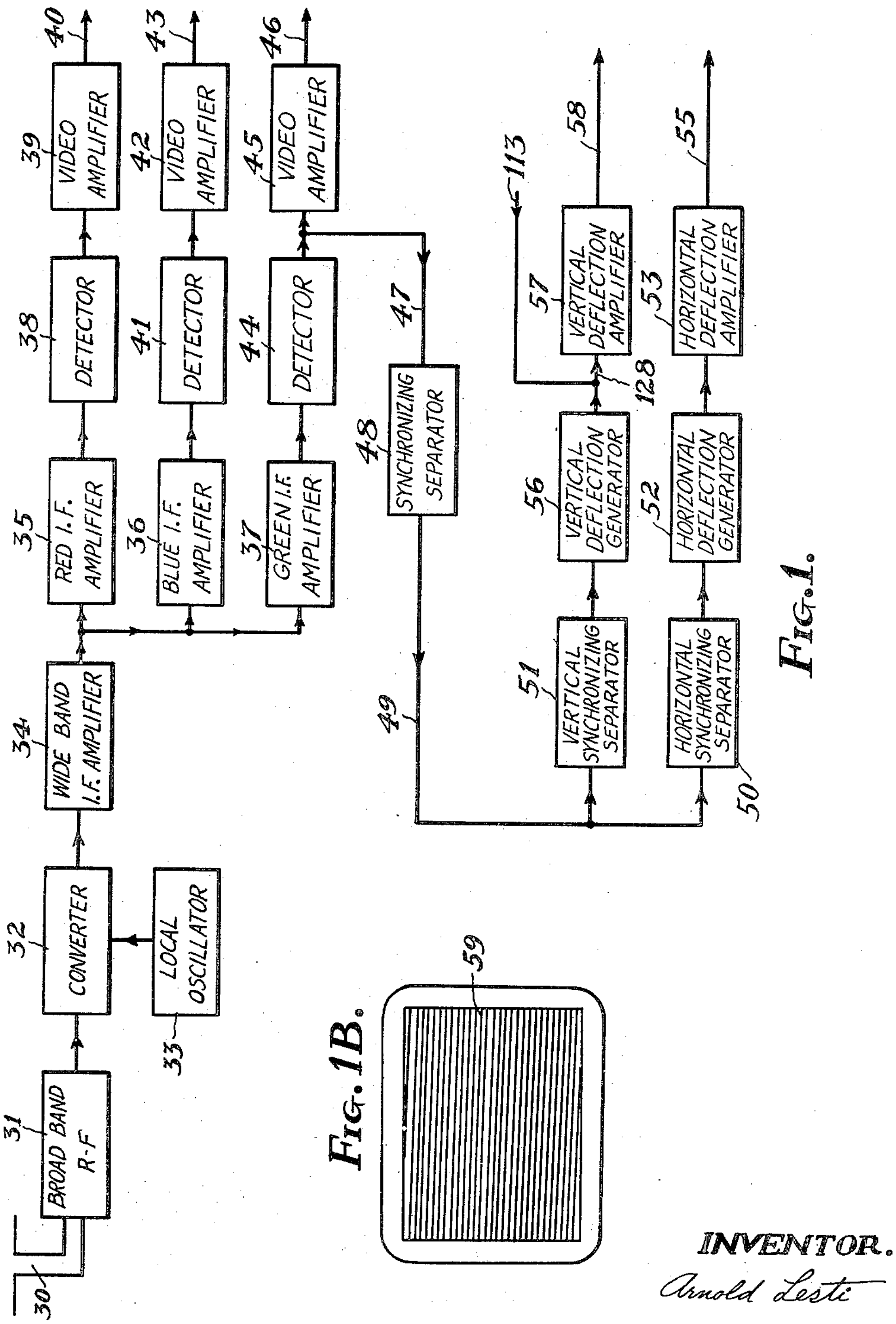
Fig. 1 is a portion of an overall block diagram of the television receiver with simultaneous color signals, and associated synchronizing and beam deflection circuits.
Fig. 1B is a reduced front face view of the cathode ray picture tube screen with horizontal phosphor areas indicated. Fewer of these areas are shown than would be actually used in order to avoid excessive detail in the drawing.

Referring to Fig. 1, the antenna 30 is coupled to the broad band radio frequency (R.-F.) selector 31. This, in turn, connects to the converter 32 which is also coupled to the local oscillator 33. In accordance with the well known operation of these units the converted output is fed to the picture wide band intermediate frequency (I. F.) amplifier 34 which feeds into three separate (I. F.) amplifiers for the red, blue, and green, video signals. The red I. F. amplifier 35 has an output fed to detector 38 whose demodulated output is applied to video amplifier 39 which delivers red video output signals to conductor 40. The blue I. F. amplifier 36 has an output fed to detector 41 whose demodulated output is applied to video amplifier 42 which delivers blue video output signals to conductor 43. The green I. F. amplifier 37 has an output fed to detector 44 whose demodulated output is applied to video amplifier 45 which delivers green video output signals to conductor 46.

Driven from the green amplifier video signals in a known and standard manner by conductor 47 is the synchronizing separator 48 which, in turn drives via conductor 49, the horizontal synchronizing separator 50 and the vertical synchronizing separator 51. The horizontal synchronizing separator 50 drives the horizontal deflection voltage generator 52 which, in turn, drives the horizonal deflection amplifier 53. The latter is connected to the horizontal deflection coils of the deflection yoke 54, shown in Fig. 1A, via conductor 55. The vertical synchronizing separator 51 drives the vertical deflection voltage generator 56 which, in turn, drives the vertical deflection amplifier 57. The latter is connected to the vertical deflection coils of the deflection yoke 54 via conductor 58. The operation of the above circuits is standard. The action of the vertical and horizontal circuits produces a raster on the screen 59 of the cathode ray picture tube generally represented as 60. The three video outputs on conductors 40, 43, and 46 are applied to the control grids of cathode ray picture tube 60. The latter has an electron gun structure consisting of three separate guns similar to the conventional types. Each of the three guns has a control grid, focusing electrode, accelerating electrode, and vertical and horizontal deflection electrodes. These electron guns may be placed as close together as possible. They can be built smaller than the conventional types with closer spacing of the deflection electrodes. A possible arrangement of the electron guns is shown in Fig. 1C as seen from the front end. Other types of gun structures may be used. The object is to have three independently modulated sources of electron beams.

Figure 4:
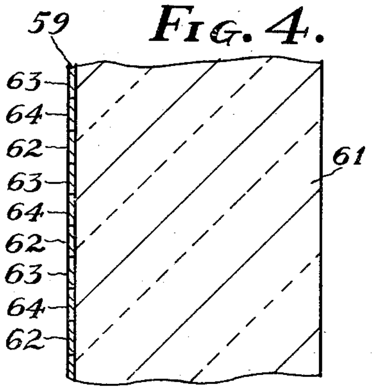
Fig. 4 is a sectional view on the line 4—4 of Fig. 3.
Figure 3:
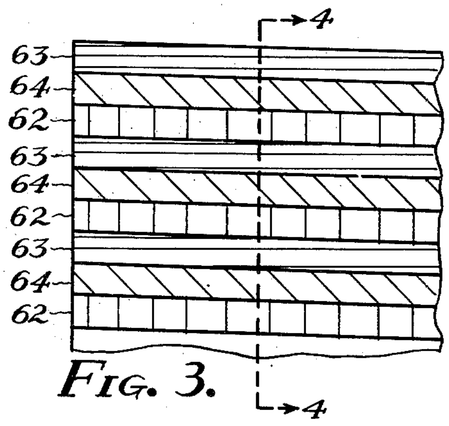
Fig. 3 is an enlarged view of a small portion of the screen of Fig. 1B showing the contiguous color producing phosphor areas.

The screen 59 of the cathode ray picture tube 60 is composed of substantially horizontal contiguous areas of color producing phosphors, indicated in Fig. 1B, and in detail in Fig. 3, and Fig. 4, in which 61 indicates a glass portion of the picture tube. One of these areas has a red light emitting phosphor 62, the next one below has a blue light emitting phosphor 63, while the area immediately above the red area has a green light emitting phosphor 64. The phosphors are deposited on the screen surface of the interior of the picture tube in parallel horizontal strips which may have a slight downward slant substantially equal to that of cathode ray beam when it moves across the screen from left-to-right. Precision of position is unnecessary. The number of horizontal color strips is greater than three times the number of horizontal lines necessary to build up one complete picture. The downward spaces sequence of color emitting areas may be red, blue, green, red, blue, green, and etc., as shown in Fig. 3, and Fig. 4. The numeral 62 represents red light emitting phosphor or any other suitable red light emitting luminescent material, 63 represents blue light emitting phosphor, and 64 represents green light emitting phosphor. The downward sequence of color emitting phosphor strips could also be red, green, blue, red, green, blue, and etc.

Figure 1A:
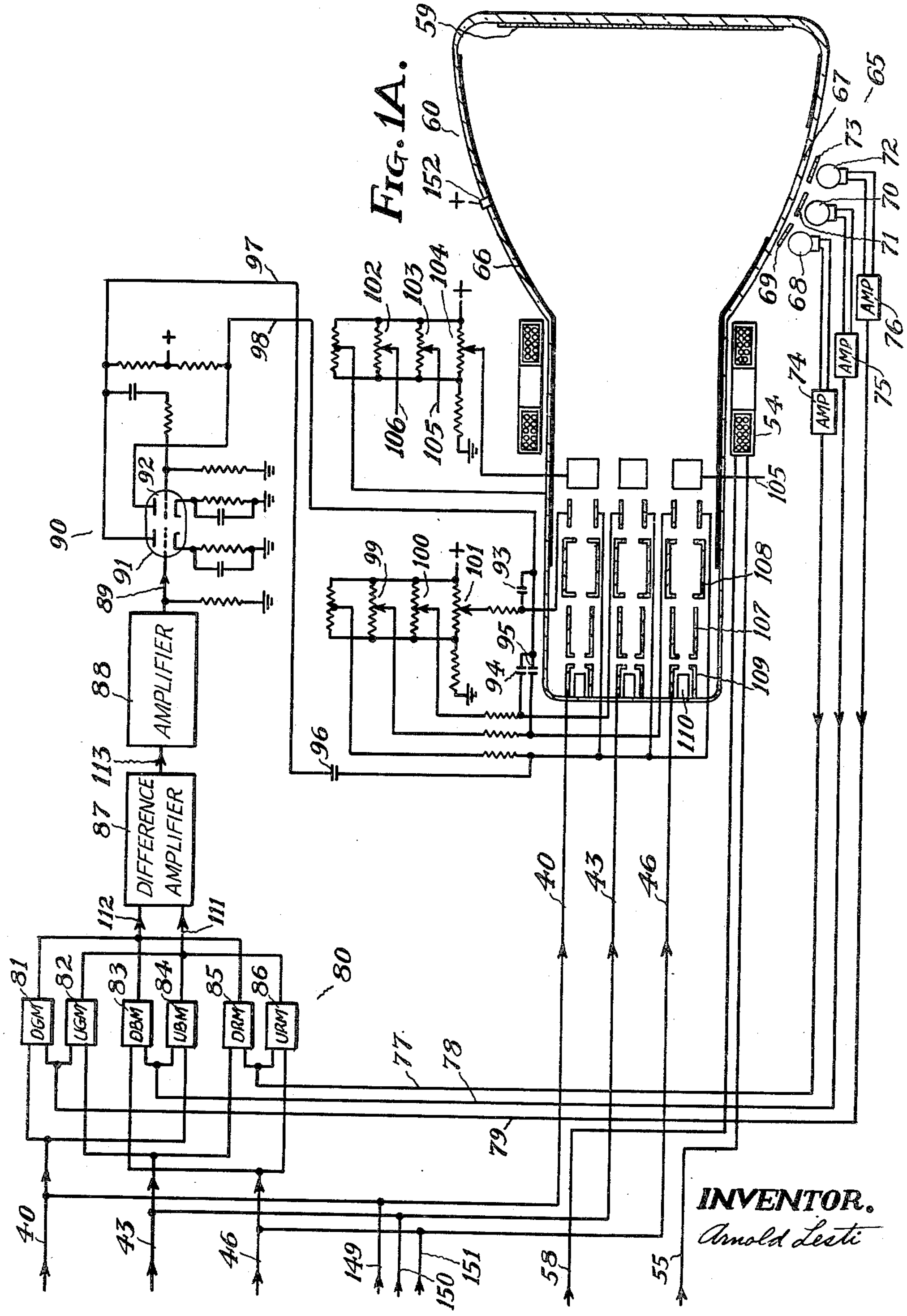
Fig. 1A is an extension of Fig. 1 showing the triple beam tube, photoelectric tubes and connections thereto.
Figures 1C, 2:
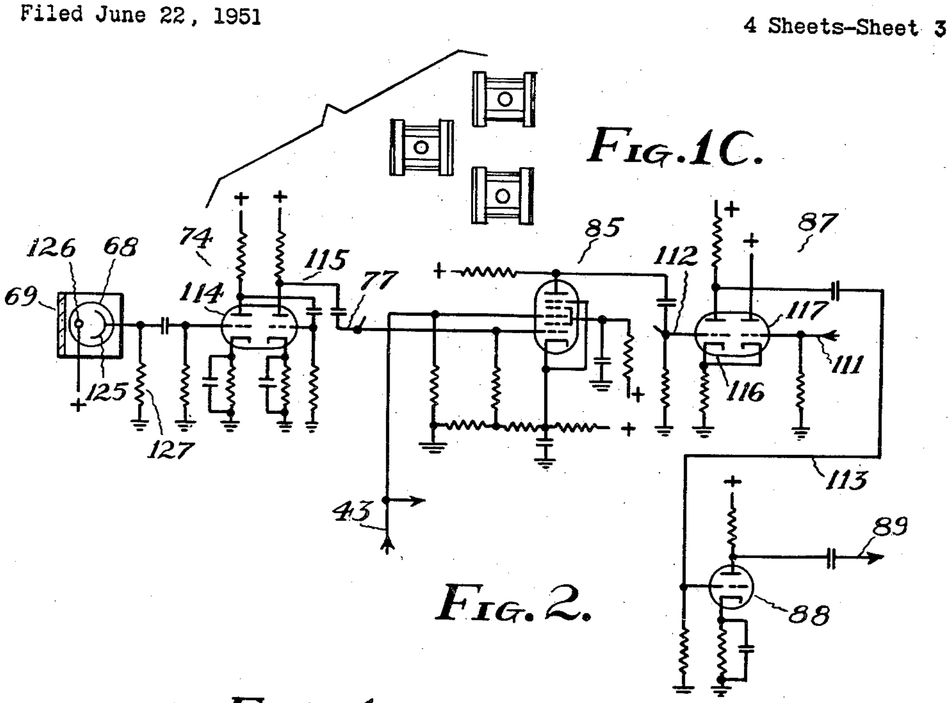
Fig. 1C is a front view of the triple beam producing gun structure of the cathode ray tube.
Fig. 2 is a detailed circuit of the photoelectric tube, amplifiers, and gain control circuits shown in block diagram in Fig. 1A.

There are photoelectric tubes generally represented by 65 in Fig. 1A which receive light reflected from the back surface of the screen 59. The cathode ray picture tube has a colloidal graphite coating 66 on its interior surface as shown with electrode 152 connected to a standard source of high positive anode potential. There is a clear transparent portion 67 in the tube to permit light emitted from the back surface of the screen 59 to go through to photoelectric tubes generally represented by 65 and consisting of photoelectric tube 68 with red filter 69, photoelectric tube 70 with blue filter 71, and photoelectric tube 72 with green filter 73. Light rays caused by bombardment of the screen 59 will go through transparent portion 67 of tube 60 and through the color filters 69, 71, and 73, and into the respective tubes 68, 70, and 72. Each tube will be responsive only to the light of color which corresponds to the light passed by its associated color filter. The light that reaches the photoelectric tubes will cause passage of current through them from a fixed source of voltage, circuit of which is described in detail hereinbelow.

The outputs of photoelectric tubes 68, 70, and 72 are connected to amplifiers 74, 75, and 76 respectively. The outputs of these amplifiers are connected by conductors 77, 78, and 79 respectively to multiplying circuits generally represented by 80 and consisting of the downward green multiplier (DGM) 81, upward green multiplier (UGM) 82, downward blue multiplier (DBM) 83, upward blue multiplier (UBM) 84, downward red multiplier (DRM) 85, and upward red multiplier (URM) 86. Conductor 77 from the red photoelectric tube amplifier 74 is connected to red multipliers 85 and 86. Conductor 78 from the blue photoelectric tube amplifier 75 is connected to blue multipliers 83 and 84. Conductor 79 from the green photoelectric tube and amplifier 76 is connected to green multipliers 81 and 82.

The video outputs are also connected to these multipliers. The red video output on conductor 40 is connected to multipliers 81 and 84, while the blue video output on conductor 43 is connected to multipliers 82, and 85, and the green video output on conductor 46 is connected to multipliers 83 and 86. The red video output signal voltages on conductor 40 are also applied to the control grid of the gun of cathode ray picture tube 60 whose electron beam is directed onto the red light emitting areas of the screen 59. The blue video output signal voltages on conductor 43 are also applied to the control grid of the gun whose electron beam is directed onto the blue light emitting areas of the screen. The green video output signal voltages on conductor 46 are also applied to the control grid of the gun whose electron beam is directed onto the green light emitting areas of the screen.

The outputs of multipliers 81, 83, and 85 are connected to one of the inputs 112 of difference amplifier 87. This input and the output voltages are out-of-phase. The outputs of multipliers 82, 84, and 86 are connected to the other input 111 of reversing amplifier 88. This other input and the output voltages are in-phase. The output of difference amplifier 87 on conductor 113 is connected to amplifier 88 which reverses phase and connects to conductor 89. This is applied to auxiliary deflection amplifier 90 which consists of amplifiers 91 and 92. The voltages at conductor 89 are applied to amplifier 91 which reverses and applies them to the control grid of amplifier 92. The outputs of amplifiers 91 and 92 are 180° out-of-phase and are applied in push-pull to the vertical deflection electrodes of the three guns. Each set of vertical deflection electrodes receives the same output from amplifier 90 through condensers 93, 94, 95, and 96, via conductors 97 and 98. Individual biasing adjusting potentiometers 99, 100 and 101 are provided for adjusting the positioning of the electron beam in the vertical direction for each gun. The connections are shown to the vertical plates. The horizontal plates have similar individual bias adjusting potentiometers 102, 103, and 104 which are connected to the horizontal deflection electrodes in a manner similar to the vertical electrodes although not all connections are shown for the horizontal circuit as they are for the vertical. Conductor 105 is connected to the lower horizontal deflection electrode, while conductor 106 is connected to the center horizontal deflection electrode. Heater connections and connections to focusing and anode electrodes are standard and are not shown. One focusing control for the three guns may be used in some cases when there is sufficiently uniformity in performance. Focusing electrode or first anode 107, accelerating electrode or second anode 108, grid control electrode 109, and heater 110 of the lowest gun are duplicated in the other guns.

After leaving the region of the horizontal deflection biasing electrodes the electron beams arrive in a region under the control of the deflection yoke 54 which has vertical and horizontal deflection coils. The deflection currents in the yoke will give the three beams the standard picture scanning motion. Adjustment of individual positioning bias may be done by opening the vertical deflection circuit, for example, at conductor 58, and opening conductors 43 and 46 to the control grids of the picture tube. A first horizontal line will be observed on the screen whose vertical position may be varied over a small range. This should be set at approximately the center of the vertical range. Then conductor 43 should be closed and a second horizontal line will appear. Potentiometer 100 should be adjusted so that this line will appear immediately below the first line with separation between centers equal to the distance between centers of adjacent horizontal color strips on the screen. Then conductor 46 should be closed and a third horizontal line will appear. Potentiometer 99 should be adjusted so that the third line will appear immediately below the second line and separated from it by the same distanace that the second line is separated from the first. When conductors 43 or 46 are opened the grids of the picture tube may be connected to a negative voltage. Of course, it is not necessary to open conductors 43 and 46 at all. Adjustment may be made by watching the three lines as each is moved by the adjusting potentiometer. The final result is that the lines should be separated by the correct amount one below the other in proper order. Horizontal biasing may be set by adjusting potentiometers 102, 103, and 104 until the edges of the horizontal lines are lined up. The potentiometers should not have a range much greater than the expected maximum variation of the spots on the screen due to the three guns. If the three guns can be aligned by initial construction and assembly so that the same accelerating voltage applied to all of them will give correct spot alignment no potentiometers would be necessary. Any gun structure may be used which will place three independently modulated electron beams focused on the screen with the required fixed vertical displacement between them. By keeping the beams close together as they enter the region under the influence of the yoke scanning motion imparted to them will not disturb the permanent vertical displacement of the three spots on the screen for any position of the raster to which the beams may be deflected. The beams may be thus considered as a triple beam.

Multiplier 81 receives voltages from conductors 40 and 79 and delivers an output on conductor 112 proportional to the product of the voltages on conductors 40 and 79. Multiplier 82 delivers an output on conductor 111 proportional to the product of the voltages on conductors 43 and 79. Multiplier 83 delivers an output on conductor 112 proportional to the product of the voltages on conductors 46 and 78. Multiplier 84 delivers an output on conductor 111 proportional to the product of the voltages on conductors 40 and 78. Multiplier 85 delivers an output on conductor 112 proportional to the product of the voltages on conductors 43 and 77. Multiplier 86 delivers an output on conductor 111 proportional to the product of the voltages on conductors 46 and 77. Internal operation of the multipliers is described hereinbelow. The multipliers 80 may be considered to be modulators or non-linear mixers, since modulators are non-linear mixers and deliver a multiplicative component.

Color control will first be described by assuming the simplified condition that only one of the color video signals on conductors 40, 43, or 46 is present at one time. In this way basic circuit operations will be explained. After this the full explanation will be given with video color modulation simultaneously present on all conductors 40, 43, and 46.

When the electron beam strikes the screen light is emitted of a color which depends upon where the beam strikes and the degree of modulation on the three portions of the beam due to the video modulations applied to them. If red light is emitted the photoelectric tube 68 with the red filter 69 in front of it will deliver a voltage to amplifier 74 which is applied to multipliers 85 and 86. If there is a blue signal video modulation voltage on conductor 43, its product with that on conductor 77 will produce an output conductor 112 which it is assumed is negative going when the voltages on conductors 46 and 77 are positive going. This negative going voltage is applied to the difference amplifier 87 which delivers it in reversed phase to amplifier 88 which reverses further and delivers it to conductor 89 as negative going and to amplifier 90 which will produce a negative going voltage on conductor 98 and a positive going voltage on conductor 97. Since conductor 97 drives the lower set of auxiliary vertical deflection electrodes and conductor 98 drives the upper set of auxiliary vertical deflection electrodes the beam will be moved in the downward direction. The significance of this is that the presence of blue video signal modulation demands the production of blue light and if red light is produced the beam will be deflected downward with a force proportional to product of the blue signal modulation and the red light. This is required because the blue light emitting areas of the screen are located immediately below the red light producing areas and the beam tends to move to the area which will emit the blue color in this case. If red and green video modulations are not present the portion of the triple beam caused by the blue video controlled gun will be turned on to the extent that video modulation exists, and the spot of light caused by this beam will move towards the blue producing region. On the other hand, if the light emitted should be green there will be voltage on conductor 79 which is applied to multipliers 81 and 82. If blue signal video modulation voltage is present on conductor 43 its product with that on conductor 79 will produce an output on conductor 111 which is negative going. The latter is applied to the difference amplifier 87 from which after going through amplifier 88 it is applied on conductor 89 as a positive going signal. The polarity of this voltage is opposite to that of the previous instance cited above. Therefore, the electron beam will be deflected in the upward direction which will move the spot away from the green emitting areas and onto the blue emitting area. It is to be noted that blue light emitted by the picture tube will cause a voltage to be placed on conductor 78 which is applied to multipliers 83 and 84. These are not connected to the blue video signal conductor 43. Hence when blue light is produced with video modulation on conductor 43, its intensity will be proportional to the signal on conductor 43 and there will be no tendency for the beam to move off of the blue emitting areas. During the scanning operation as the beam sweeps from left-to-right, at the start of sweep the beam may hit the red area either wholly or in part. A quick downward moving voltage will be generated to send the beam into the blue producing area. As the beam moves from left-to-right as a result of scanning any tendency to move off of the blue producing area into the red area immediately above it will generate a voltage to cause the beam to move downward into the blue emitting region. The beam will stabilize with a very small portion of it in the red region to generate a downward voltage to cancel the deviation from the blue region which is caused by the regular picture scanning system.

In a similar manner if the beam had started its horizontal movement on the extreme left on the green emitting area it would be caused to move upward into the blue region with a small portion of the beam on the green area to generate an upward voltage to cancel the original deviation from the blue region with which the beam started the horizontal movement. Any additional tendency to move off of the blue emitting area onto the blue region will produce a voltage tending to move it back into the blue emitting region. If the electron beam with blue video signal modulation present starts its horizontal movement on the left side exactly between the green and red emitting areas, this improbable condition would be one of unstable equilibrium because the voltages due to the two colors will be tending to move the beam in opposite directions such that once one of the directions is started it will build up and continue, and then the case can be treated as one of the cases described hereinabove.

In a similar manner if the red video signal is present and the others absent the beam will move towards the red emitting areas, and if the green video signal modulation is present and the others absent the beam will move towards the green emitting areas. If the beam diameter is slightly larger than the width of a color strip the beam will center approximately on the correct color emitting areas with the overlapping portions on either side producing voltages of opposite polarity on conductor 89, hence canceling except for a small residual amount required to offset the initial displacement of the scanning system. The light due to the overlapping portions on the adjacent areas will combine with a portion of the light from the correct center area creating a small amount of white light superimposed on strong light corresponding to the center area. The displacement of the beam from the true center due to cancellation of the initial displacement of the scanning system will be negligible if the amplification in the color control circuit is adequate. The amount of amplification required is lessened by the small actual movement required of the beam to affect maximum color changes.

The description given hereinabove is a simplified preliminary version in which the video signals were assumed to be present one at a time on conductors 40, 43, and 46. When the signals are present simultaneously, the three multipliers act simultaneously to deliver an output on conductor 89. If this output is negative the triple beam will move downward. If the output on conductor 89 is positive the triple beam will move upward. The output on conductor 112 is the sum of the outputs from multipliers 81, 83, and 85, while the output on conductor 111 is the sum of the outputs from multipliers 82, 84, and 86. The output at conductor 89 is proportional to the difference in outputs on conductors 111 and 112 because 87 is a difference circuit which subtracts the voltage on conductor 112 from that on conductor 111 and delivers a voltage proportional to this difference to amplifier 88.

When the video signals are present simultaneously on all conductors 40, 43, and 46 the control grids of picture tube 60 will allow a triple beam to strike the screen. In Fig. 5A there is illustrated various positions which the triple beam may occupy in relation to the contiguous phosphor strips. These and all possible intermediate positions will be analyzed. Assume that the triple beam of electrons strikes the screen as shown in Fig. 5A–M. Assume that the beam diameters are equal, and for the first analysis let the beam diameters be either equal to or less than the width of a strip. Let $P$=proportion of lower side of a beam on a given color strip. $0 \leq P \leq 1$. When $P=1$, the entire beam is on a given color strip. When $P=0$ no part of a beam is on a given color strip. Let $K_1R$, $K_1B$, $K_1G$ represent the beam intensity due to the red, blue, and green video voltages R, B, and G in the respective guns. $K_1$ is a constant. When a beam falls on a given area the color emitted will be determined by the area regardless of which of the three beams strikes that area. If a red area is struck by a beam the voltage generated at conductor 77 is given by $K_1K_2PR$, in which $K_2$ is a constant, P is the proportion of the beam occupying the red area and $K_1R$ is the beam intensity due to the red gun. This is illustrated by the R circle in Fig. 5A–M, where part of the circle corresponding to the beam spot is on the red emitting area. In M the beam due to the blue gun is also on the red area. The voltage generated on conductor 77 due to this portion is given by $K_1K_2(1-P)B$. The total voltage on conductor 77 is $K_1K_2(PR+(1-P)B)$. This is multiplied by the voltage B on conductor 43 by the multiplier 85 giving $$-K_1K_2(PR+(1-P)B)B$$

on conductor 112, and by the voltage G on conductor 46 giving $-K_1K_2(PR+(1-P)B)G$ on conductor 111. The voltages are subtracted by the difference circuit and applied to conductor 113. If the voltage on conductor 113 is positive it will be negative on conductor 89 and if it is negative on conductor 113 it will be positive on conductor 89. A positive voltage on conductor 113 will cause the triple beam to be moved downward while a negative voltage on conductor 113 will cause the triple beam to move upward. The result on conductor 113 of the subtraction circuit 87 on the voltages given above will be, for green light produced in case M, $$K_1K_2K_3[(PR+(1-P)B)B-(PR+(1-P)B)G]$$

in which $K_3$ is a constant. Let $K=K_1K_2K_3$. In a similar manner the result of the electron beams striking the blue light emitting areas is a voltage at conductor 113 given by $$K[(PB+(1-P)G)G-(PG+(1-P)G)R]$$

For the green light the result is $$K[(PG+(1-P)R)R-(PG+(1-P)R)B]$$

Adding these voltages will give the total net voltage on conductor 113 due to all causes for case M. This gives, after combining terms, $$\begin{aligned} V=K[&(PRB+(1-P)B^2+PBG+(1-P)G^2+\\ &PGR+(1-P)R^2)-(PRG+(1-P)BG+\\ &PBR+(1-P)GR+PGB+(1-P)RB)]\\ =K&(1-P)[(B^2+G^2+R^2)-(BG+GR+RB)] \end{aligned}$$

As a result of Schwartz's inequality, $$(B^2+G^2+R^2) \geq (BG+GR+RB)$$

for all independent amplitudes of B, G, and R. Therefore, the term inside the bracket is always positive or zero. It is equal to zero when $B=G=R$. Since $0 \leq P \leq 1$, $0 \leq (1-P) \leq 1$. $K_1$ and $K_2$ were chosen positive so that the voltages applied to the multiplier inputs are positive going due to increasing light increments. The difference amplifier 87 reverses the voltage at 112 to conductor 113, while it passes the voltage on conductor 111 in the same sign to conductor 113. Any voltage at the input of the multipliers is passed on to conductor 113 with the same sign via 112. Therefore, $K_3$ is positive and K is positive. It follows that V, the voltage on conductor 113, is positive, and is zero only if $B=G=R$, that is, if all the video signals are of the same intensity. If the video signals vary simultaneously but keep equal values then $V=O$. This means that when the video signals are equal there will be no force tending to move to triple beam. But in this case movement is unnecessary because white light is produced and called for since equal amounts of red, blue, and green light are produced which blend as white light regardless of where the triple beam strikes. The above inequality shows that whenever there is a difference in intensity of the video signals, movement is always in the same direction, namely, downward for case M, Fig. 5A. This is true for all $0 \leq P \leq 1$. When $P=1$ case L is covered. Then $V=0$ regardless of the intensity of the video signals. This means that if the red controlled beam is centered on the red area, the blue controlled beam is centered on the blue area, and the green controlled beam is centered on the green area no color control voltage is produced and hence no deflection. This is as it should be because then the triple beam is positioned correctly. When $P=0$ case N is covered, V is maximum positive and the triple beam will be moved downward. Cases where $0<P<1$ cover all other positions between L and M including N.

Cases N, Q and S of Fig. 5A will now be analyzed.

For red light the voltage produced at conductor 113 is given by, $$K[(PB+(1-P)G)B-(PB+(1-P)G)G]$$

For blue light, $$K[(PG+(1-P)R)G-(PG+(1-P)R)R]$$

For green light, $$K[(PR+(1-P)B)R-(PR+(1-P)B)B]$$

The combined result is, $$V=KP[(B^2+G^2+R^2)-(BG+GR+RB)]+K(1-P)[(GB+RB+BR)-(G^2+R^2+B^2)]$$

Let $$W=(B^2+G^2+R^2)-(BG+GR+RB) \geq 0$$

Then $$V=KW(2P-1)$$

If $P<\frac{1}{2}$, V is negative giving an upward force. In this case the triple beam would reach a correct position by moving through a shorter distance than if it moved downward. If $P>\frac{1}{2}$, V is positive giving a downward force. In this case the triple beam would move through a shorter distance to reach a correct position. If $P=\frac{1}{2}$, $V=0$, case Q, and there is no force tending to move the triple beam. However, this is a condition of unstable equilibrium and if this improbable event should occur when the beam starts moving in one direction the force in that direction will build up and the case can then be treated as one of the above cases. If $P=1$, case N is covered and the downward force is maximum. If $P=0$, case S is covered and the upward force is maximum. Cases where $0<P<1$ cover all other positions between N and S.

Cases S, T, and U will now be analyzed.

For red light the voltage produced at conductor 113 is given by, $$K[(PG+(1-P)R)B-(PG+(1-P)R)G]$$

For blue light, $$K[(PR+(1-P)B)G-(PR+(1-P)B)R]$$

For green light, $$K[(PB+(1-P)G)R-(PB+(1-P)G)B]$$

The combined result is, $$V=KP[(GB+RG+BR)-(G^2+R^2+B^2)]+K(1-P)[(RB+BG+GR)-(RG+BR+GB)]$$

$$=-KPW$$

V is always negative or zero, moving the beam upward. If $P=0$, case U is covered, $V=0$, the triple beam is perfectly centered and no force is generated tending to move it out of position. Of course, the beam will move very slightly either up or down out of center to generate a force to offset the force which may tend to keep the beam in the regular scanning positions as determined by the regular horizontal and vertical deflection system. If $P=1$, case S is covered and the beam is moved upwardly with maximum force. Cases where $0<P<1$ cover all other positions between S and U.

Case V covers the situation when the beam spot diameter is greater than the height of a strip. For this case let Y be the value of P when the beam spans the area with portions of the beam outside of the area above and below it. Then $(1-Y)$ is the proportion of the beam outside of the given color area. Let Z equal the proportion of $(1-Y)$ outside on the upper side then $Z(1-Y)$ is the proportion of the beam outside of the area on the upper side and $(1-Z)(1-Y)$ on the lower side. $0 \leq Z \leq 1$.

For the case of red light, some of the green controlled beam falls on the red emitting area on the lower side by $(1-Z)(1-Y)$ and some of the blue controlled beam falls on the red emitting area on the upper side by $Z(1-Y)$. The voltage to multipliers 85, 86 from conductor 77 is given by $K_1K_2[(YR+(1-Z)(1-Y)G+Z(1-Y)B]$. This is mulitiplied by B in multiplier 85 and by G in multiplier 86. The result for red light on conductor 113 is given by, $$K[(YR+(1-Z)G+Z(1-Y)B)B-(YR+(1-Z)(1-Y)G+Z(1-Y)B)G]$$

For blue light, $$K[(YB+(1-Z)(1-Y)R+Z(1-Y)G)G-(YB+(1-Z)(1-Y)R+Z(1-Y)G)R]$$

For green light, $$K[(YG+Z(1-Y)R+(1-Z)(1-Y)B)R-(YG+Z(1-Y)R+(1-Z)(1-Y)B)B]$$

Adding the above for the combined effect gives, $$V=K[(YRB+(1-Z)(1-Y)BG+Z(1-Y)B^2)-(YRG+(1-Z)(1-Y)G^2+Z(1-Y)BG)+(YBG+(1-Z)(1-Y)RG+Z(1-Y)G^2)-(YBR+(1-Z)(1-Y)R^2+Z(1-Y)GR)+(YGR+Z(1-Y)R^2+(1-Z)(1-Y)BR)-(YGB+Z(1-Y)RB+(1-Z)(1-Y)B^2)]$$

$$=KZ(1-Y)[(B^2+G^2+R^2)-(BG+GR+RB)]+K(1-Z)(1-Y)[(GB+RG+BR)-(G^2+R^2+B^2)]$$

$$=K[Z(1-Y)W+(1-Z)(1-Y)(-W)]$$

$$=KW(2Z-2ZY+Y-1)$$

If $Z=\frac{1}{2}$, $V=0$ for all Y. This means that if the amount of overlap of each beam above the color area to which the beam corresponds is equal to that below, then there is no force tending to move the beam. If $Z>\frac{1}{2}$, V is positive. If the beam overlaps more above than below the restoring force is downward. If $Z<\frac{1}{2}$, V negative. If the beam overlaps more below than above the restoring force is upward. The minimum value of Y for which the above formula is valid for $0 \leq Z \leq 1$ is up to the condition where the beam diameter equals the height of two adjacent strips. It is expected that the overlap will be kept below this. When a beam with greater diameter than the height of the strip moves partly out of a strip so that there is no overlap on one side then the conditions are analyzed in the same manner as for the previous cases M, Q, and T.

It remains to analyze the conditions such as N and S, Fig. 5A, but with beam spot diameters greater than the height of a strip of color emitting area. For the case N with wide beam, the red light emitted will yield voltage at conductor 113 given by, $$K[(YB+Z(1-Y)G+(1-Z)(1-Y)R)B-(YB+Z(1-Y)G+(1-Z)(1-Y)R)G]$$

For blue light, $$K[(YG+Z(1-Y)R+(1-Z)(1-Y)B)G-(YG+Z(1-Y)R+(1-Z)(1-Y)B)R]$$

For green light, $$K[(YR+Z(1-Y)B+(1-Z)(1-Y)G)R-(YR+Z(1-Y)B+(1-Z)(1-Y)G)B]$$

Adding for the combined results gives, $$V=KY[(B^2+G^2+R^2)-(BG+GR+RB)]+KZ(1-Y)[(GB+RG+BR)-(G^2+R^2+B^2)]+K(1-Z)(1-Y)[(RB+BG+GR)-(RG+BR+GB)]$$

$$=KYW+KZ(1-Y)(-W)$$

$$=KW(Y-Z(1-Y))$$

When $Z=0$, V is positive, which signifies that the beam spots are overlapping on the lower sides of the color strips only. When the beam spots overlap on the upper sides only $Z=1$. This is the case when V may become negative for certain values of Y. For proper performance in case N, V must be positive to cause the triple beam to move downward. If we assume that the beam spot diameter shall be less than the height of two adjacent color strips, the least value of Y is given by, $$Y=\frac{4}{\pi}\int_0^{\frac{1}{2}}\sqrt{(1-x^2)}dx$$

$$\frac{4}{\pi}\cdot\frac{1}{2}(x\sqrt{(1-x^2)}+\sin^{-1}x)\Big|_0^{\frac{1}{2}}=.61 \text{ approx.}$$

For this value, $V=KW[.61-Z(.39)]$. For all $0\leq Z\leq 1$, V is positive and is always positive except when $R=B=G$, then $W=0$ which means that white light is called for, and the triple beam will give this light in any position. Otherwise, $W>0$, and the motion of the beam is downward to the correct color emitting areas.

Case S, Fig. 5A, with beam spot diameter greater than the height of a strip is exactly the same as case N treated immediately hereinabove if the following transformation is made:

$$V^1\rightarrow -V$$
$$Z^1\rightarrow 1-Z$$
$$G\rightarrow R$$
$$B\rightarrow B$$
$$R\rightarrow G$$

Movement upward for case S corresponds to downward for case N.

Figure 5:
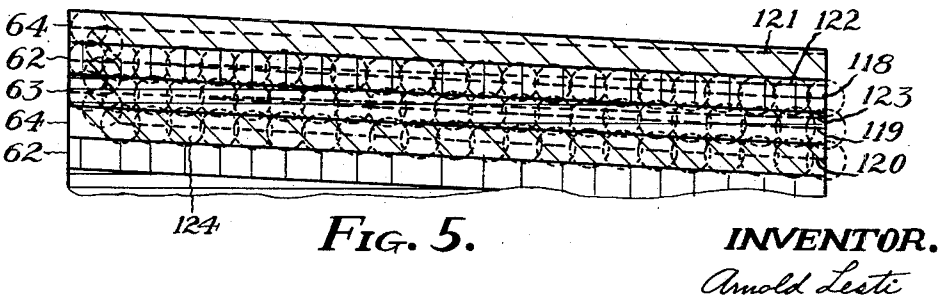
Fig. 5 is an enlarged view, with contracted width, of horizontal color emitting phosphor areas, showing how a triple beam of electrons wrongly strikes incorrect color emitting areas at the start of the horizontal motion and the path the triple beam travels on to reach the correct color emitting areas.

In Fig. 5 there is illustrated a triple beam striking the screen on the left side during the start of horizontal scanning. The triple beam starts in the wrong position as in case N, Fig. 5A. The numeral 62 represents the red emitting regions, 63 represents the blue and 64 represents the green areas. This is also shown in Figures 3, 4, and 5. In Fig. 5 the path of the triple beam 124 is shown towards the correct color emitting regions on which the beam stays for substantially the whole time of horizontal movement. Dotted lines 118, 119, and 120 indicate the center of the actual paths of the three portions of the triple beam, while dotted lines 121, 122, and 123 indicate the wrong centers of the paths that the beam would move in if feedback color control is not present.

In Fig. 2 there is shown circuit details of one of the photoelectric tubes 68 and associated amplifier 74. The photoelectric tube 68 and light filter 69 for the red light is taken as a typical case, the others have identically the same type of circuit. The photoelectric tube has cathode 125 coupled to the control grid of amplifier tube 114. The anode 126 of the photoelectric tube is connected to a source of positive potential. When red light passes through the red filter 69 and reaches the cathode 125 electrons are emitted by the latter. These are attracted towards the anode 126 and a current flows through resistor 127 placing a positive potential on the cathode end of that resistor with respect to ground. The increase of light entering the photoelectric tube will cause a positive going potential to be applied on the control grid of tube 114. The tube amplifies and reverses the signal, which is then applied to tube 115, which in turn amplifies the signal further and delivers it to the first grid of multiplier tube 85 via conductor 77. The third grid of multiplier tube is connected to conductor 43 with blue video signal. The multiplier tube 85 has such an operating characteristic that its mutual conductance is substantially a linear function of the voltage on its third grid over a considerable range. Its output voltage, therefore, will be proportional to the product of the voltages on its first and third grids. The output of multiplier tube 85 on conductor 112 is applied to difference amplifier 87 which consists of tubes 116 and 117 with common cathode resistor. The control voltage applied to the grid of tube 116 will be delivered in reverse phase to conductor 113, while any control voltage on the grid of tube 117 from conductor 111 will appear in the same phase on conductor 113. Control voltages applied to the two grids simultaneously will cause a voltage to appear on conductor 113 which is proportional to the difference of the two voltages. The net voltage on conductor 113 is applied to amplifier tube 88 which reverses its phase and applies the amplified control voltage to conductor 89. From this point it is applied to amplifier 90 whose operation has been described hereinabove. While only multiplier 85 is shown in detail it serves as a typical case. The other multipliers 81, 82, 83, 84, and 86 may have similar circuits. However, any adequate means which can multiply voltages may be used instead of the circuit shown in Fig. 2. The same is true for the subtraction circuit. If the photoelectric tubes are sufficiently sensitive, amplifiers such as 74 may be eliminated and the output of the photoelectric tube 68 may be applied directly into the first grid of multiplier tube 85. Where two triodes are shown in one envelope standard separate envelopes may be used. The tubes in the various drawings are shown without the cathode heaters in order to avoid excessive details in the drawings, but it is understood that heaters are provided for all tubes and connected to a suitable source of voltage.

In the color controlled vertical deflection system described hereinabove the same vertical deflection electrodes which are used to establish vertical bias adjustment were also used for auxiliary color control deflection. An alternative arrangement is to leave the vertical electrostatic deflectors for bias adjustment only, and use the regular vertical deflection magnetic system illustrated in Fig. 6 with color control voltages superimposed thereon. In this case the regular vertical deflection voltages are supplied on conductor 128 from the vertical deflection generator. Conductor 128 is connected to the control grid of driver tube 129 which drives the vertical deflection coils 130, 131 through output transformer 132. Conductor 113 is tied to conductor 128. In Fig. 2 conductor 113 is shown connected to the grid of tube 88. When the circuit of Fig. 6 is used conductor 113 is not connected to the grid of tube 88, but connected to conductor 128 instead. Fig. 6 when used has elements 129 and 132 which are contained in the box indicated as 57 in Fig. 1. When using the circuit of Fig. 6 vertical deflection coils 130 and 131 may have fewer turns of heavier wire and a driver tube 129 of greater current handling capacity may be used so that higher frequencies may be accommodated. The color control voltages on conductor 113 are superimposed on the regular vertical deflection voltages and the result is that the current going through the coils 130, 131 is decreased slightly from its normal volume due to the regular deflection voltage on conductor 128, to cause a relative upward color control movement of the electron beam, and the current through the coils is increased to cause a relative downward movement of the electron beam for color control, or vice versa.

Another variation of this method is the circuit shown in Fig. 7. Conductor 113 is then connected to driver tube 133 whose output is fed to transformer 134 which is coupled to the auxiliary vertical deflection coils 135 and 136 for color control. Regular vertical deflection coils 137 and 138 are indicated connected to conductors 139 which are operated from the regular vertical deflection amplifier such as is designated as box 57 in Fig. 1. The regular horizontal coils 140 and 141 are connected to conductors 142 which are operated from the regular horizontal deflection amplifier shown as box 53 in Fig. 1.

A further method of exercising color control deflection is to have auxiliary electrostatic vertical deflection electrodes immediately in front of the deflection yoke nearer to the screen than the yoke, and to operate these by amplifier 90. A further version is that if the biasing deflection electrodes are unnecesary because of accurate construction, the individual deflectors may be eliminated and a single pair of auxiliary color control vertical deflection electrodes may be placed behind the yoke nearer to the cathodes, to deflect the beams or triple beam. These deflectors could also be operated by amplifier 90.

In Fig. 1A the photoelectric tubes are shown behind a transparent portion 67 of the cathode ray tube. This transparent portion may take the form of a clear opening in the collodial graphite which is customarily used around the inside of the tube. The glass of the tube is transparent and allows light to pass through. If the back flared portion of the tube is made of metal, transparent glass portions may be inserted in the metal to allow the light to pass. Another possible arrangement is to place the photoelectric tubes inside of the cathode ray picture tube out of the way of the electron beam, and positioned to receive the reflected light from the back of the screen. The glass envelopes of the photoelectric tubes may be constructed of the appropriate colored material to act as light filters. Each tube would have a colored glass envelope corresponding to the color of light to which it is to be sensitive. The photoelectric tubes may be placed in any position where they will receive light from the screen. If the color producing phosphor is aluminized it should be done to the extent where at least some light is emitted in the back direction if the light sensitive devices are in that direction. The light sensitive devices may be placed in front of the cathode ray tube out of the way of the viewer.

The scheme may be used also with a projection tube of the color television system wherein the image on the tube screen is optically projected onto a screen. The reflected or transmitted light from the screen may be picked up by photoelectric tubes facing the screen. The circuitry is otherwise similar to that described hereinabove. Another variation is to have a standard black-and-white phosphor screen on the cathode ray picture tube, and to optically project the image on the phosphor screen of the tube onto a screen with colored transparent or translucent portions thereon which may be arranged substantially in the horizontal direction similar to the arrangement of the color phosphors of the picture tube described hereinabove. This system is illustrated in Fig. 8 in which cathode ray picture tube 143 has a standard phosphor screen 144 the image on which is projected by lens 145 onto the color screen 146 through reflector 147. Photoelectric tubes 148 receive the reflected light from the screen 146. The color of the light received by the tubes 148 will depend upon where the white spot on the phosphor screen 144 is projected by lens 145 and reflector 147 onto color screen 146. In Fig. 8 the dotted lines indicate the path of the light rays through the optical system.

The color control circuit involving the photoelectric tubes and associated amplifiers, the multipliers difference amplifiers and other amplifiers with deflection electrodes need not pass a frequency bandwidth as wide as the video circuits 40, 43, and 46. A bandwidth substantially equal to that of the regular horizontal deflection circuits will give results, although a greater bandwidth than this is preferable. The multipliers will average the effects of the fast video circuit signals when multiplied with the slower signals from the photoelectric tubes as far as the outputs on conductors 111, and 112 are concerned. As the triple beam moves on the horizontal strips, since these strips are in the same general direction as the movement of the triple beam itself due to the regular picture scanning action, the amount of actual correction needed is small and not subject to quick changes. Therefore, most of the energy in the color control circuit will be concentrated at the horizontal repetition frequency. The video modulation on the control grids of the picture tube will cause the color modulation along the horizontal lines. These modulations do not effect the sense of the color correction because of the inequality, $(R^2+B^2+G^2)\geqq(RB+RG+BG)$. If $R=B=G$, white light is called for, and no correcting voltages will be present because the inequality becomes an equality, but in this case white light is given regardless of where the beam is positioned. However, the beam will stay on the path which it held when $$(R^2+B^2+G^2)>(RB+RG+BG)$$

for a time because of the lower bandwidth of the color correction circuits. If white light doesn't stay on too long, the inequality when reestablished will find the triple beam substantially on the correct area so that little correction is needed.

The number of color corrections needed per horizontal line will not be incompatible with the persistence time of fast phosphors. The number of horizontal color strips is greater than three times the number of scanning lines required to build up one complete picture so that when the vertical height of the picture is made the smallest as set by servicing the adjustments, there will still be at least as many triple sets of color strips as there are horizontal scanning lines. Persistence in emitting light after the beam is moved will have aftereffects on the color control circuit. For example, if the blue modulation video signal is present alone, and the beam starts on the left side on a red color emitting strip, the red light will be emitted quickly and the beam will start moving quickly into the blue producing region. Persistence of light emission by the red producing area will cause part of the lower section of the beam to move into the green emitting area to a greater extent than it would without persistence, but the green area starts to emit green light quickly, thus producing as quick a correction to the extra movement as the bandwidth of the color control circuits will allow, tending to keep the beam in the blue region. This over correction will subside when the red light is no longer emitted. The required blue light is produced, however, in substantially the same brightness than if persistence had not been present. The effects of integration of the color control voltages due to reduced bandwidth of the system as a whole will cause action like what in the art is called automatic-volume-control. That is, the gain or magnitude of the transfer function from the electron beam intensity to the light produced by the electron beam will be varied by the correction movements of the beam as it moves off of a color emitting strip by a force which is the result of integration. This action will cause less color control for weak modulation. A higher gain in the control circuit amplifiers will permit color control for electron beams of lower intensity. Wider frequency bandwidth will reduce lowering of control at low beam intensities.

If the color system requires that a separate black-and-white component be provided which may be transmitted on a separate channel or video circuit, this may be applied to the circuits through conductors 149, 150, and 151. While not illustrated, these conductors may be connected to the output circuits of separate tubes. That is, conductor 149 would be connected to the plate of a tube via a condenser, conductor 150 to another, and conductor 151 to still another. The three tubes could have their grid circuits tied together and connected to single video circuits which would complement circuits of conductors 40, 43, and 46. The extra circuit will have the black-and-white modulations which are injected into conductors 40, 43, and 46 with the same instantaneous amplitude. Therefore, the triple beam of the picture tube will be modulated to produce white light or a black-and-white picture component. This will combine with the separate color components individually controlled from the color signals on conductors 40, 43, and 46 to produce a composite picture. The bandwidths of the three color circuits as well as the black-and-white circuit if it is wanted at all, may be suitably chosen for the desired effects. Amplifiers 39, 42, and 45 contain suitable standard clamping circuits for direct current restoration. While the simultaneous color video signals are separated out by three distinct intermediate frequency circuits and applied to busses 40, 43, and 46, other methods may be used to provide the separate signals, such as separate and distinct radio frequency receivers for each color, or by interleaved pulse amplitude, pulse time, pulse width, or pulse code modulation on the same carrier. Three interleaved sets of pulses plus one set for black-and-white if desired may be multiplexed by means well known to the art and brought out at the receiver on separate circuits, corresponding to those indicated on conductors 40, 43, and 46 for the color modulations, and the single circuit which drives conductors 149, 150, and 151 if black-and-white modulation is also wanted. The multiplex repetition rate must be greater than the top video frequency required. Other methods may be used. This invention is primarily concerned with what takes place after the video signals are placed on the conductors such as 40, 43, and 46 representing simultaneous color information. That is, the signals are simultaneous to within the period of the highest video frequency required.

Good electron beam focusing throughout the entire screen is preferred for this color receiving system. The diameter of one of the triple beam spots on the screen should be preferably about equal to the height of a color strip, and should be less than the combined heights of two adjacent strips. If there are 1500 color strips on a picture screen fifteen inches high, this will call for a spot diameter, for each of the separate spots of the triple beam, of about ten thousandths of an inch preferably, and less than twenty thousandths of an inch.

Standard black-and-white television receivers may receive the green light modulated carrier which will give satisfactory black-and-white pictures. In Fig. 1 this is shown as containing the synchronizing signals brought out on conductor 47. The color television receiver may receive signals from black-and-white transmitters if the demodulated signals from such transmitting stations are brought out on a conductor which drives the tubes simultaneously which are connected to conductors 149, 150, and 151 illustrated in Fig. 1A. In such a case black-and-white pictures will be given by the picture tube.

While I have described the principles of my invention in connection with specific apparatus, it is to be understood that this description is made only by way of example and not as a limitation to the scope of my invention.

I claim:

1. A color television receiver comprising a signal receiver having color signals for each of the primary colors, a cathode ray tube with separate cathode ray beam portions for each of the primary colors with each portion adapted to be modulated by a corresponding one of the color signals of the signal receiver, a luminescent screen on said picture tube having separate portions thereon for each of the primary colors and each portion is adapted to emit light of one of the primary colors when the electron beam strikes it, light sensitive devices with associated color filters adapted to produce outputs in accordance with the intensity of the light emitted by the luminescent screen, means for producing an upward output proportional to the product of each instantaneous color video signal with the output of the light sensitive device whose color differs from that represented by the color video signal, means for producing a downward output proportional to the product of each instantaneous color video signal with the output of the light sensitive device whose color representation differs from both the color representation of the video signal and that of the light sensitive device which is used for the upward output by the video signal, means for combining all the upward outputs, means for combining all the downward outputs, means for subtracting the value of the downward outputs from that of the upward outputs, means for utilizing the subtracted output for directing the electron beam so that each beam portion strikes that section of the screen which emits color which is in accordance with the color which is modulating the corresponding beam portion, whereby simultaneous primary colors are emitted by the luminescent screen in accordance with the modulations.

2. A color television receiver having color video signals for each of the primary colors, a cathode ray picture tube having a luminescent screen with substantially horizontal parallel areas arranged in sets there being one set for each of the primary colors and each set is adapted to emit light of one of the primary colors when struck by the electron beam, separate portions of the electron beam for each of the primary colors with each portion adapted to be modulated by a corresponding color video signal, light sensitive devices with associated color filters for each of the primary colors adapted to produce outputs in response to the light emitted by the screen, means including modulators for simultaneously modulating each color video signal by the outputs of a pair of light sensitive devices whose color representations differs from that of the color video signal producing modulator outputs, means for combining a first set of modulator outputs, means for combining the remaining set of modulator outputs, and means for directing the electron beam onto the luminescent screen by the difference between the first and second sets of modulator outputs.

3. A color television receiver according to claim 2 wherein the said modulators comprise two multiplying circuits for each primary color.

4. A color television receiver having color video signals for each of the primary colors, a cathode ray picture tube having a luminescent screen with substantially horizontal parallel areas arranged in sets there being one set for each of the primary colors, means adapting adjacent areas to emit different primary colors when struck by the electron beam, separate portions of the electron beam for each primary color with each portion adapted to be modulated by a corresponding color video signal, horizontal and vertical deflection circuits adapted to deflect the beam for picture scanning, light sensitive devices with associated color filters for each of the primary colors adapted to produce outputs in response to the light emitted by the luminescent screen, means including mixing circuits for simultaneously mixing each color video signal with the outputs of a pair of light sensitive devices whose color representations differ from that of the video signal producing mixed outputs, means for combining a first set of mixed outputs, means for combining the remaining set of mixed outputs, and means for directing the electron beam onto the luminescent screen by the difference between the first and second sets of mixed outputs.

5. A color television receiver according to claim 4 wherein the said mixing circuits consist of multi-grid tubes with a color video signal applied to one grid of a tube and the output of a light sensitive device to another grid of the same tube, the gain through the tube of one signal on a grid being changed by the signal on the other grid.

6. A color television receiver according to claim 4 wherein the last mentioned means include a tube with the first set of mixed outputs applied to its control grid, another tube with the remaining set of mixed outputs also applied to its control grid, the said tubes being coupled by connected cathodes, and the difference being delivered from the plate circuit of one of the tubes.

8. A color television receiver having color video signals for each of the primary colors, a cathode ray picture tube with separate beam portions for each primary color with each beam portion adapted to be modulated by a corresponding one of the color video signals, a phosphor screen on the picture tube having separate portions for each primary color and each portion is adapted to emit light of one of the primary colors when struck by the electron beam, light sensitive devices with associated color filters for each primary color adapted to produce outputs in response to the light emitted by the phosphor screen, means for simultaneously multiplying the color video signals by the outputs of the light sensitive devices, and means responsive to the results of the multiplication for deflecting the electron beam portions.

2. A color television receiver having color video signals for each of the primary colors, a cathode ray tube with separate beam portions for each of the primary colors with each beam portion adapted to be modulated by a corresponding color video signal, a phosphor screen on the picture tube having separate portions thereon for each of the primary colors and each portion is adapted to emit light of one of the primary colors when struck by the electron beam, light sensitive devices with associated color filters for each primary color adapted to produce outputs in response to the light emitted by the phosphor screen, a pair of mixing circuits for each primary color, means for simultaneously mixing in the mixing circuits the color video signals and the outputs of the light sensitive devices producing a mixed output, and means responsive to the mixed output for deflecting the electron beam portions.

9. A color television receiver according to claim 9 wherein the said mixing circuits include tubes having multiple control grids with the transconductance from the control grid of a tube to its plate being changed by signals applied to another control grid of the same tube, and the said video signals and the outputs of the light sensitive devices being applied to the said control grids.

References Cited in the file of this patent

UNITED STATES PATENTS

| | | |
|---|---|---|
| 8,415,059 | Zworykin | Jan. 28, 1947 |
| 2,587,074 | Sziklai | Feb. 26, 1952 |
| 2,621,244 | Landon | Dec. 9, 1952 |